United States Patent
Wu et al.

(10) Patent No.: US 8,413,097 B2
(45) Date of Patent: Apr. 2, 2013

(54) COMPUTING DEVICE AND METHOD FOR CHECKING DESIGN OF PRINTED CIRCUIT BOARD LAYOUT FILE

(75) Inventors: Dan-Chen Wu, New Taipei (TW); Shou-Kuo Hsu, New Taipei (TW); Chun-Jen Chen, New Taipei (TW)

(73) Assignee: Hon Hai Precision Industry Co., Ltd., New Taipei (TW)

(*) Notice: Subject to any disclaimer, the term of this patent is extended or adjusted under 35 U.S.C. 154(b) by 0 days.

(21) Appl. No.: 13/523,874

(22) Filed: Jun. 14, 2012

(65) Prior Publication Data
US 2013/0055190 A1    Feb. 28, 2013

(30) Foreign Application Priority Data
Aug. 30, 2011    (TW) .............................. 100130991 A

(51) Int. Cl.
*G06F 17/50*    (2006.01)

(52) U.S. Cl. ........ 716/115; 716/106; 716/111; 716/112; 716/137; 716/139

(58) Field of Classification Search .................. 716/137, 716/106–115, 126–131, 139
See application file for complete search history.

(56) References Cited

U.S. PATENT DOCUMENTS

| | | | |
|---|---|---|---|
| 2004/0015796 A1* | 1/2004 | Frank et al. ........................ 716/5 |
| 2009/0083687 A1* | 3/2009 | Sadamatsu et al. ............... 716/8 |
| 2011/0023005 A1* | 1/2011 | Tsubamoto .................... 716/137 |
| 2011/0066266 A1* | 3/2011 | Nakano ........................... 700/98 |

* cited by examiner

*Primary Examiner* — Nha Nguyen
(74) *Attorney, Agent, or Firm* — Altis Law Group, Inc.

(57) ABSTRACT

A computing device reads a printed circuit board (PCB) layout file from a storage device. The PCB layout file includes arrangement information of signal lines, power lines, and power through-holes arranged on a PCB. Furthermore, the computing device sets a reference distance between a selected power through-hole and a neighboring signal line, and searches for one or more line segments of one or more signal lines where the a distance between each of the one or more line segment and the selected power through-hole is less than the reference distance.

9 Claims, 4 Drawing Sheets

COMPUTING DEVICE AND METHOD FOR CHECKING DESIGN OF PRINTED CIRCUIT BOARD LAYOUT FILE

BACKGROUND

1. Technical Field

Embodiments of the present disclosure relates to circuit simulating systems and methods, and particularly, to a computing device and a method for checking design of a printed circuit board (PCB) layout file.

2. Description of related art

PCB production processes may include designing a PCB layout, and manufacturing a printed wiring board (i.e., a bare board) according to the PCB layout.

A PCB is often arranged with thousands of transmission lines, such as power lines that transmit power to components on the PCB, signal lines that transmit signals between the components, and ground lines connected to ground. When the power lines pass through holes on the PCB (hereinafter, the holes which the power lines pass through are called power through-holes), transient changes in current can cause coupling interference, which can influence integrity of signal transmission over the signal lines. Thus, distances between the power through-holes and the signal lines should be designed accordingly. With the large number of signal transmission lines and power through-holes distributed in and on the PCB, manually checking distances is not only time-consuming, but also error-prone.

DETAILED DESCRIPTION

The disclosure, including the accompanying drawings in which like references indicate similar elements, is illustrated by way of examples and not by way of limitation. It should be noted that references to "an" or "one" embodiment in this disclosure are not necessarily to the same embodiment, and such references mean at least one.

In general, the word "module," as used hereinafter, refers to logic embodied in hardware or firmware, or to a collection of software instructions, written in a programming language, such as, for example, Java, C, or Assembly. One or more software instructions in the modules may be embedded in firmware. It will be appreciated that modules may comprised connected logic units, such as gates and flip-flops, and may comprise programmable units, such as programmable gate arrays or processors. The modules described herein may be implemented as either software and/or hardware modules and may be stored in any type of computer-readable medium or other computer storage device.

Figure 1:
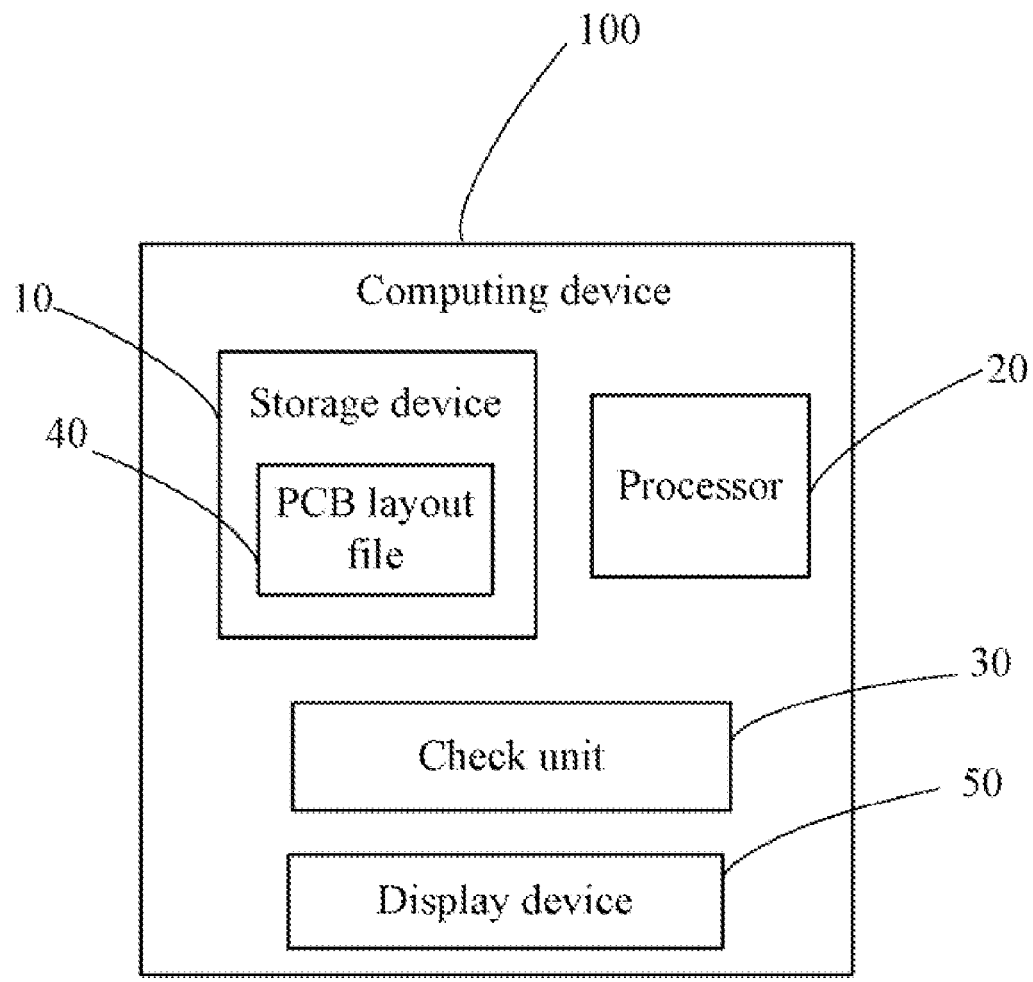
FIG. 1 is a block diagram of one embodiment of a computing device comprising a check unit for checking design of a PCB layout file.
Figure 2:
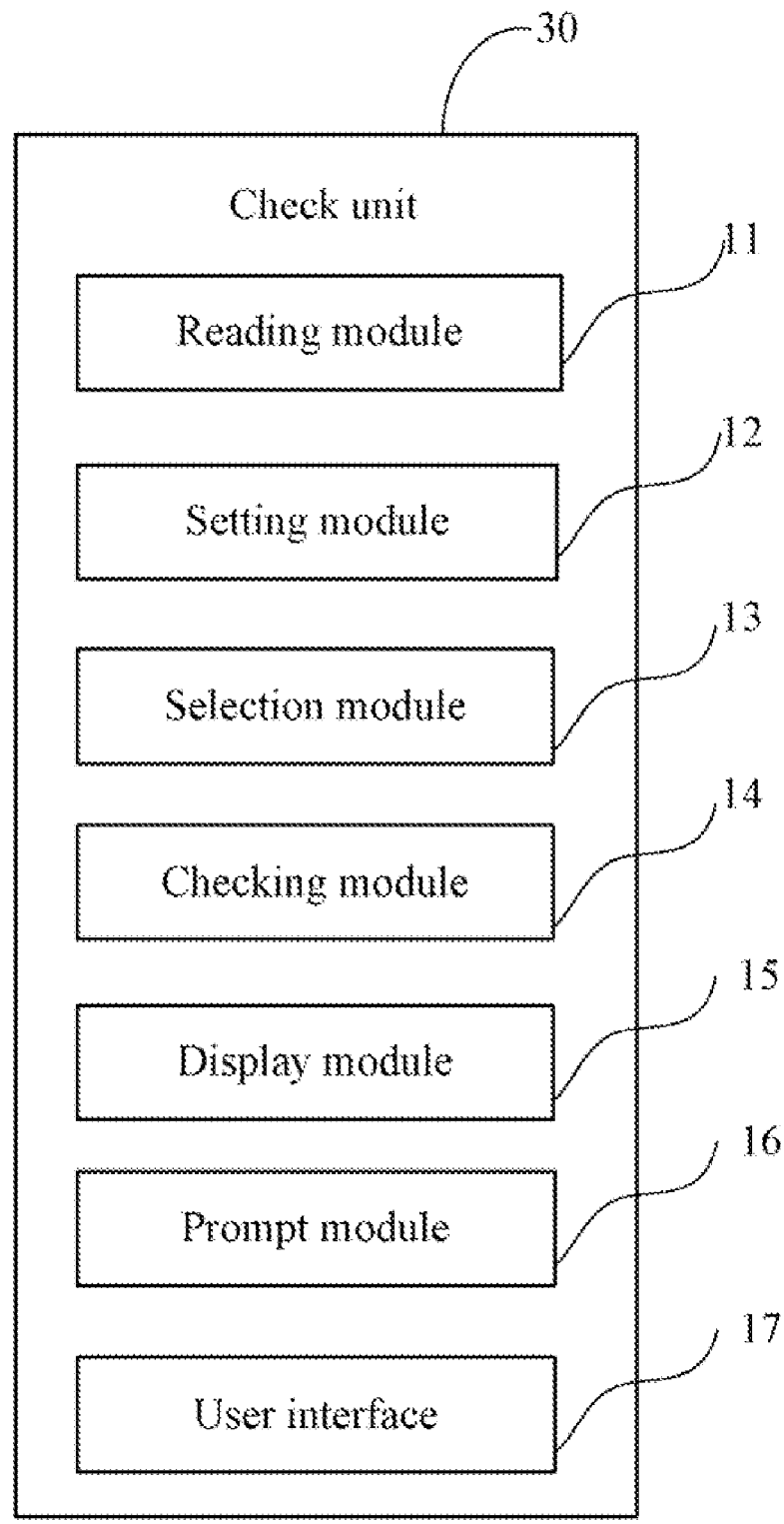
FIG. 2 is a block diagram of one embodiment of function modules of the check unit in the computing device of FIG. 1.

FIG. 1 is a block diagram of one embodiment of a computing device 100. The computing device 100 includes a storage device 10, a processor 20, a check unit 30, a printed circuit board (PCB) layout file 40. The computing device 10 may further include a display device 50 or electronically connect to a display device 50. The check unit 30 includes a number of function modules (as shown in FIG. 2). The function modules may comprise computerized code in the form of one or more programs that are stored in the storage device 10. The computerized code includes instructions that are executed by the processor 20, to check design of one or more PCBs in the PCB layout file 40, such as a distance between a power throughhole and each of signal lines in the one or more PCBs in the PCB layout file 40. A power though-hole corresponds to a hole which passed through by one or more power lines that transmit power to components on a PCB. Each signal line corresponds to a wire that transmits a signal between components on the PCB. The PCB layout file 40 can comprise one or more files detailing layout information of transmission lines and related components of one or more PCBs.

The storage device 10 further stores design standards of the transmission lines in the PCB layout file 40, such as a reference distance between each line segment of a signal line and a power though-hole. The display device 50 displays the PCB layout file 40 and a user interface 17 provided by the check unit 30 that allows selection of transmission lines and power through-holes to be checked and outputs results of the check. Depending on the embodiment, the storage device 20 may be a smart media card, a secure digital card, or a compact flash card. The computing device 100 may be a personal computer or a server, for example.

FIG. 2 is a block diagram of the function modules of the check unit 30 in the computing device 100 of FIG. 1. In one embodiment, the check unit 30 includes a reading module 11, a setting module 12, a selection module 13, a checking module 14, a display module 15, a prompt module 16, and the user interface 17. A description of functions of the modules 11-16 follows in reference to FIG. 3.

Figure 3:
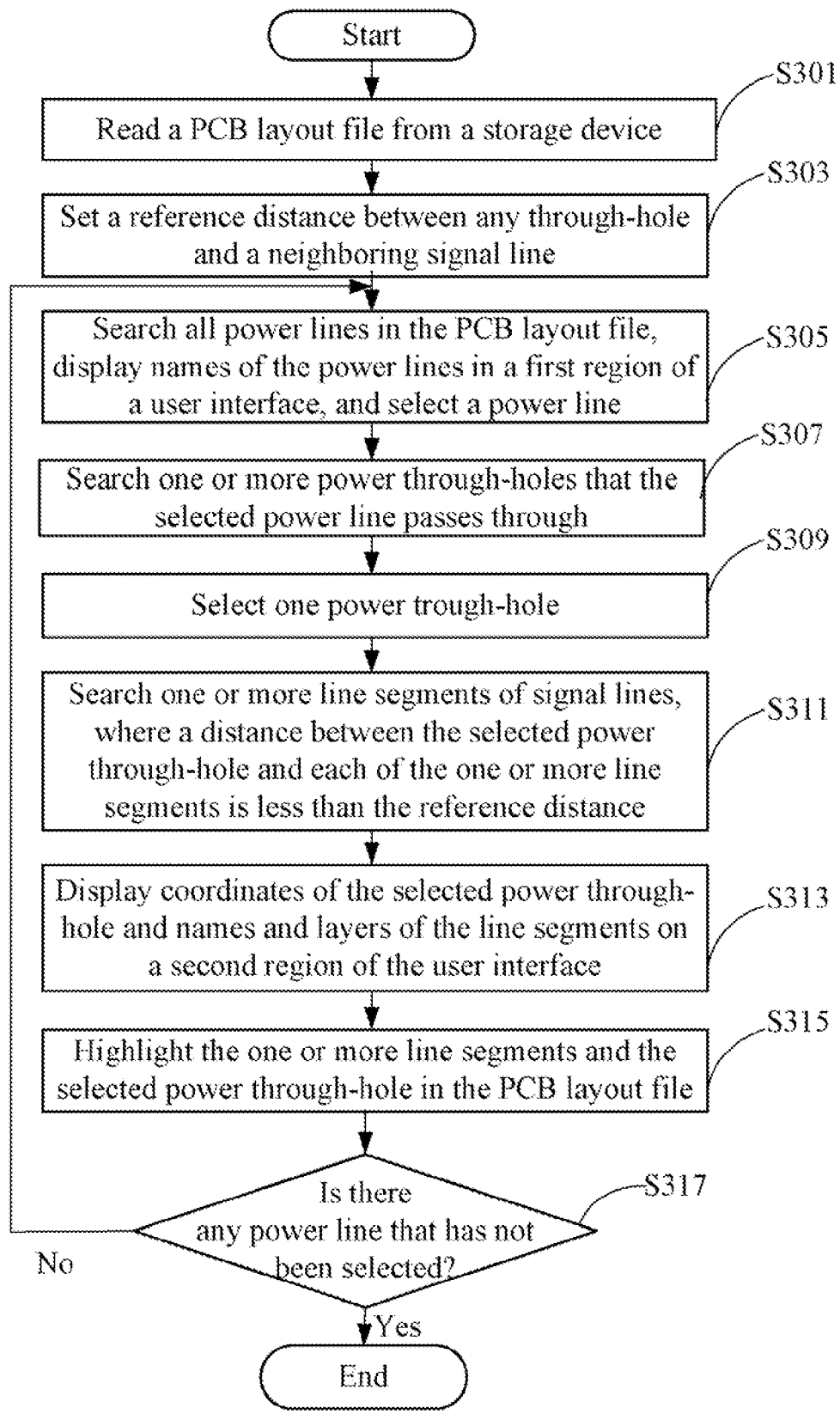
FIG. 3 is a flowchart of one embodiment of a method for checking design of a PCB layout file.

FIG. 3 is a flowchart of one embodiment of a method for checking design of the PCB layout file 40. Depending on the embodiment, additional steps may be added, others removed, and the ordering of the steps may be changed.

In step S301, the reading module 11 reads the PCB layout file 40 from the storage device 10. As mentioned above, the PCB layout file 40 includes arrangement information of the transmission lines of a PCB, such as a number of the transmission lines arranged on the PCB, a length of each transmission line, a number of power through-holes, a layer in which each power through-hole is located, coordinates of the power through-holes, and association information between power lines and power through-holes. The transmission lines include power lines, signal lines, and ground lines, for example. The association information between the power lines and the power through-holes includes which power lines pass through which power through-holes.

In step S303, the setting module 12 receives a reference distance, where the reference distance is, in one example, according to a distance between a particular power throughhole and a neighboring signal line. In another example, the reference distance may be a distance between any (or a random) power through-hole and a neighboring signal line to the respective power through-hole. For example, the reference distance may be set as 40 mil. The reference distance may be determined by a user or determined by the computing device 100.

In step S305, the checking module 14 searches all power lines in the PCB layout file 40, and the display module 15 displays names of the power lines in a first region of the user interface 17. For example, the power lines may be searched according to names of the power lines. Then, the line selection module 13 receives a power line selected by the user from the first region.

In step S307, the checking module 14 searches for power through-holes that the selected power line passes through in the PCB layout file 40. For example, the power through-holes that the selected power line passes through may be searched according to the association information between the power lines and the power through-holes. The display module 15 displays names of the power through-holes in the first region of the user interface 17.

In step S309, the selection module 13 receives a power through-hole selected by the user from the first region of the user interface 17.

Figure 4A:
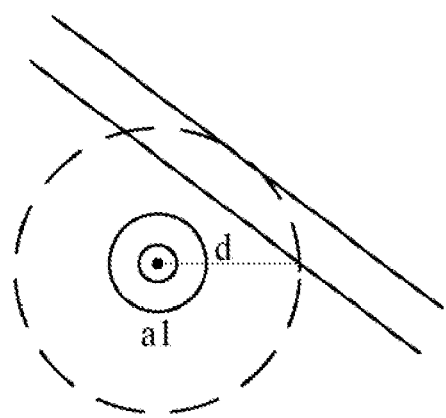
FIG. 4A illustrates searching for signal lines neighboring a power through-hole, where a distance between each found signal line and the power though-hole is less than a preset distance.

In step S311, the checking module 14 searches for one or more line segments of one or more signal lines of the PCB layout file 40, where a distance between the selected power through-hole and each of the one or more line segments is less than the reference distance. As shown in FIG. 4A, a power through-hole al is selected, the checking module 14 generates a circle by using a center of the power through-hole al as the center of the circle and the reference distance as the radius, and determines whether a distance between the center and each line segment falling within the circle is less than the reference distance.

In step S313, the display module 15 displays coordinates of the selected power through-hole and names and layers of the one or more line segments on a second region of the user interface 17.

Figure 4B:
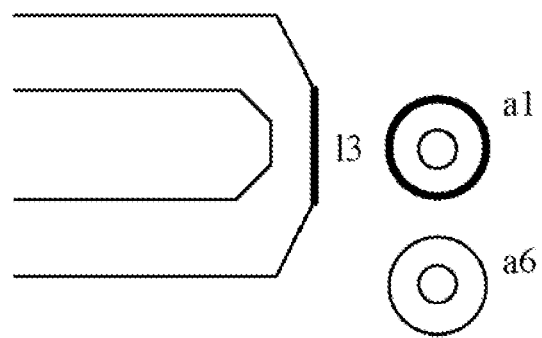
FIG. 4B illustrates highlighting the found signal lines to be too close to the power through and highlighting the power through-hole in the PCB layout file.

In step S315, the prompt module 16 highlights the one or more line segments and the selected power through-hole in the PCB layout file 40 that is displayed on the display device 50, to alert the user to amend design of the one or more line segments and/or the selected power through-hole. For example, as shown in FIG. 4B, the prompt module 16 may highlight the line segment 13 and the selected power through-hole al in the PCB layout file 11.

In step S317, the checking module 14 checks if there is any power line in the first region that has not been selected. If there is any power line in the first region that has not been selected, the procedure returns to step S305. Otherwise, if all power lines in the first region have been selected, the procedure ends.

Although certain inventive embodiments of the present disclosure have been specifically described, the present disclosure is not to be construed as being limited thereto. Various changes or modifications may be made to the present disclosure without departing from the scope and spirit of the present disclosure.

What is claimed is:

1. A method being executed by a processor of a computing device for checking design of a printed circuit board (PCB) layout file, the method comprising:

reading the PCB layout file from a storage device by using the processor, wherein the PCB layout file comprises arrangement information of signal lines, power lines, and power through-holes of a PCB;

receiving a reference distance by using the processor, the reference distance according to a distance between a selected power through-hole of the PCB and a neighboring signal line that neighbors the power through-hole of the PCB;

determining whether the design of the PCB layout file needs to be amended by searching one or more line segments of one or more signal lines by using the processor, wherein a distance between each of the one or more line segment and the selected power through-hole is less than the reference distance, and the selected power through hole is selected according to steps of: searching all power lines in the PCB layout file, and displaying names of the power lines in a first region of a user interface displayed on a display device, selecting a power line from the first region,and searching power through-holes that the selected power line passes through in the PCB layout file, and displaying names of the power through-holes in the first region, the names of the power through hole including a name of the selected through-hole; and determining that the design of the PCB layout file needs to be amended in response that the one or more line segments have been searched.

2. The method as claimed in claim 1, further comprising:
highlighting the searched one or more line segments and the selected power through-hole in the PCB layout file.

3. The method as claimed in claim 1, further comprising:
displaying coordinates of the selected power through-hole and names and layers of the one or more line segments on a second region of the user interface.

4. A computing device, comprising:
a storage device;
at least one processor; and
one or more programs stored in the storage device and executable by the at least one processor, the one or more programs comprising instructions to perform operations:

reading the PCB layout file from a storage device, wherein the PCB layout file comprises arrangement information of signal lines, power lines, and power through-holes of a PCB;

receiving a reference distance, the reference distance according to a distance between a selected power through-hole of the PCB and a neighboring signal line that neighbors the power through-hole of the PCB;

determining whether the design of the PCB layout file needs to be amended by searching one or more line segments of one or more signal lines, wherein a distance between each of the one or more line segment and the selected power through-hole is less than the reference distance, and the selected power through hole is selected according to steps of: searching all power lines in the PCB layout file, and displaying names of the power lines in a first region of a user interface displayed on a display device, selecting a power line from the first region,and searching power through-holes that the selected power line passes through in the PCB layout file, and displaying names of the power through-holes in the first region, the names of the power through hole including a name of the selected through-hole; and determining that the design of the PCB layout file needs to be amended in response that the one or more line segments have been searched.

5. The computing device as claimed in claim 4, wherein the one or more programs further comprise instructions to perform an operation:
highlighting the searched one or more line segments and the selected power through-hole in the PCB layout file, to remind a user to amend the design of the one or more signal lines or the selected power through-hole.

6. The computing device as claimed in claim 4, wherein the one or more programs further comprise instructions to perform an operation:

displaying coordinates of the selected power through-hole and names and layers of the one or more line segments on a second region of the user interface.

7. A non-transitory computer readable medium storing a set of instructions, the set of instructions capable of being executed by a processor of a computing device to perform a method for checking design of a printed circuit board (PCB) layout file, the method comprising:

reading the PCB layout file from a storage device, wherein the PCB layout file comprises arrangement information of signal lines, power lines, and power through-holes of a PCB;

receiving a reference distance, the reference distance according to a distance between a selected power through-hole of the PCB and a neighboring signal line that neighbors the power through-hole of the PCB; and determining whether the design of the PCB layout file needs to be amended by searching one or more line segments of one or more signal lines, wherein a distance between each of the one or more line segment and the selected power through-hole is less than the reference distance, and the selected power through hole is selected according to steps of: searching all power lines in the PCB layout file, and displaying names of the power lines in a first region of a user interface displayed on a display device, selecting a power line from the first region, and searching power through-holes that the selected power line passes through in the PCB layout file, and displaying names of the power through-holes in the first region, the names of the power through hole including a name of the selected through-hole; and determining that the design of the PCB layout file needs to be amended in response that the one or more line segments have been searched.

8. The medium as claimed in claim 7, wherein the method further comprises:

highlighting the searched one or more line segments and the selected power through-hole in the PCB layout file, to remind a user to amend the design of the one or more signal lines or the selected power through-hole.

9. The medium as claimed in claim 7, wherein the method further comprises: displaying coordinates of the selected power through-hole and names and layers of the one or more line segments on a second region of the user interface.

* * * * *